(12) United States Patent
Kobayashi

(10) Patent No.: US 6,200,128 B1
(45) Date of Patent: Mar. 13, 2001

(54) METHOD AND APPARATUS FOR RECOVERING SENSIBLE HEAT FROM A HOT EXHAUST GAS

(75) Inventor: Hisashi Kobayashi, Putnam Valley, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 08/871,623

(22) Filed: Jun. 9, 1997

(51) Int. Cl.[7] .................................................. F23D 14/00
(52) U.S. Cl. ............................ 431/5; 431/2; 431/115; 60/39.182; 110/204
(58) Field of Search ................ 431/5, 10, 115, 431/116, 9, 2, 6; 422/182, 183; 110/204, 342, 344, 345; 60/39.182, 617, 39.141; 122/7 R, 7 B

(56) References Cited

U.S. PATENT DOCUMENTS

| | | | |
|---|---|---|---|
| 2,110,209 | * 3/1938 | Engels | 431/115 |
| 3,868,211 | * 2/1975 | LaHaye et al. | 431/115 |
| 4,013,023 | * 3/1977 | Lombana et al. | 110/12 |
| 4,101,632 | * 7/1978 | Lamberti et al. | 431/5 |
| 4,474,121 | * 10/1984 | Lewis | 431/76 |
| 4,547,150 | * 10/1985 | Vereecke | 431/12 |
| 4,582,005 | * 4/1986 | Brown | 110/345 |
| 4,622,007 | * 11/1986 | Gitman | 431/10 |
| 4,706,612 | * 11/1987 | Moreno et al. | 60/39.182 |
| 4,761,132 | * 8/1988 | Khinkis | 431/10 |
| 4,861,262 | * 8/1989 | Gitman et al. | 431/5 |
| 4,909,727 | * 3/1990 | Khinkis | 431/10 |
| 4,923,391 | * 5/1990 | Gitman | 431/10 |
| 5,181,475 | * 1/1993 | Breen et al. | 110/345 |
| 5,224,334 | * 7/1993 | Bell | 110/345 |
| 5,402,739 | * 4/1995 | Abboud et al. | 110/345 |
| 5,488,915 | * 2/1996 | McNeill | 110/345 |
| 5,525,053 | * 6/1996 | Shelor | 431/5 |
| 5,755,818 | * 5/1998 | Tuson et al. | 431/10 |
| 5,823,124 | * 10/1998 | Koppang | 431/5 |
| 5,823,760 | * 10/1998 | Shelor et al. | 431/5 |
| 5,826,521 | * 10/1998 | Schumann et al. | 110/345 |

FOREIGN PATENT DOCUMENTS

| | | | |
|---|---|---|---|
| 2855766 | * 6/1979 | (DE) | 431/5 |
| 148167 | * 12/1978 | (JP) | 431/5 |

OTHER PUBLICATIONS

Termuehlen et al., "Repowering Existing Power Stations with Heavy–Duty Gas Turbines", 5th Int. Conf. & Exhib. for Power Generating Industries, 1992.

Finckh et al., "How to Improve the Operating Economy and Environmental Compatibility of Existing Steam Power Plants" 5th Int. Conf. & Exhib for Power Generating Industries, 1992.

Walters, "Gasification Hot–Windbox Repowering—A Different IGCC", EPRI Power Conference, Oct., 1994.

* cited by examiner

Primary Examiner—Ira S. Lazarus
Assistant Examiner—David Lee
(74) Attorney, Agent, or Firm—Donald T. Black

(57) ABSTRACT

A method and apparatus for recovering sensible heat from a hot exhaust gas having an oxygen concentration of less than 21 vol % in a fuel-air fired combustion device. An oxidant stream comprising a gas having an oxygen concentration of greater than 21 vol % is introduced into the combustion process to form an oxidant mixture comprising the hot exhaust gas, the oxidant and any air present, the mixture having an average combined oxygen concentration of less than 21 vol %.

7 Claims, 2 Drawing Sheets

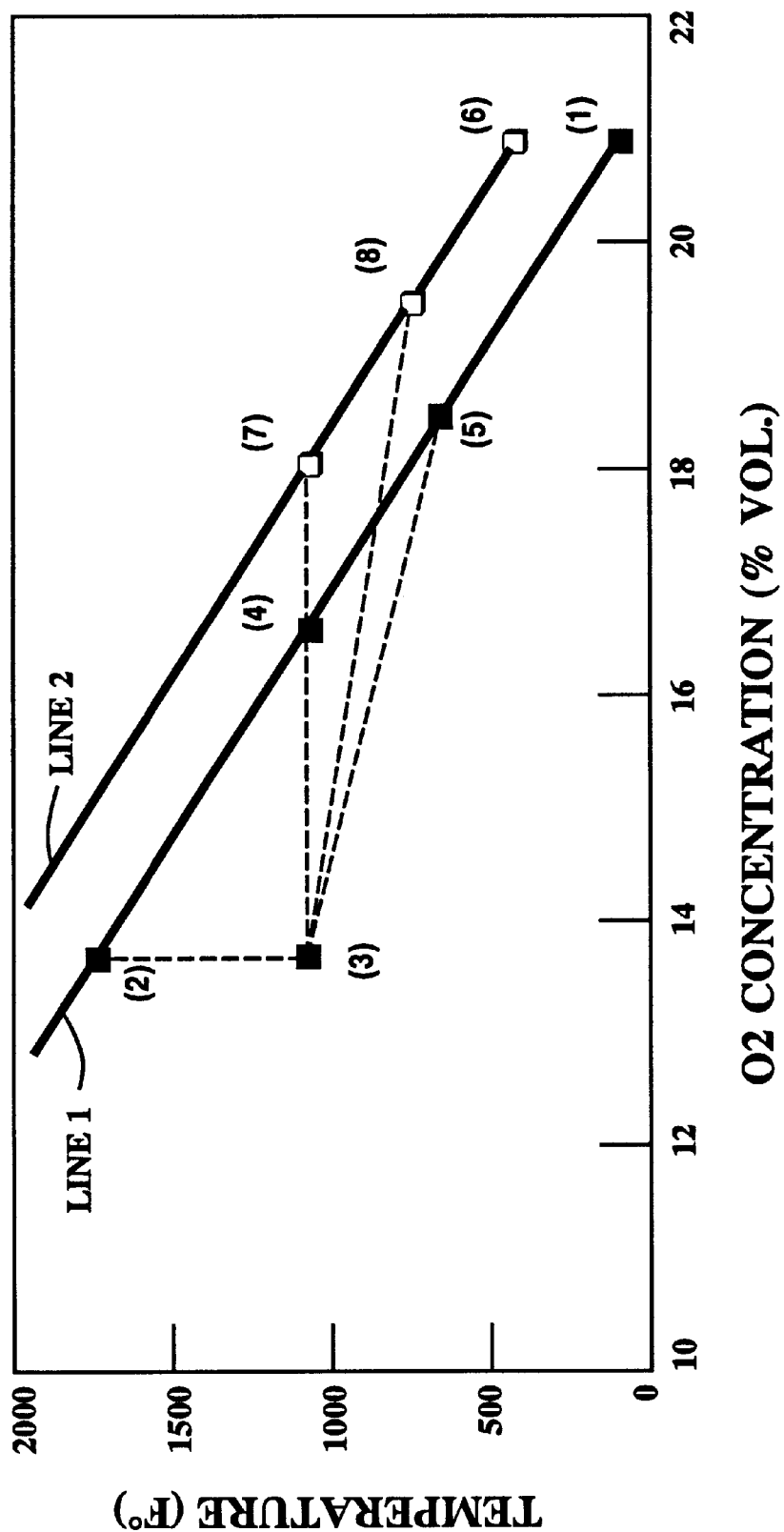

METHOD AND APPARATUS FOR RECOVERING SENSIBLE HEAT FROM A HOT EXHAUST GAS

FIELD OF THE INVENTION

This invention relates to a method and apparatus for recovering sensible heat from a hot exhaust gas.

BACKGROUND OF THE INVENTION

Waste heat from exhaust gases has been used to reduce energy costs in Brayton-cycle and Diesel-cycle combustion processes for a number of years. Such waste heat is recovered by either extracting the heat in a boiler without additional combustion of a fuel, or by using the hot exhaust gas as a preheated oxidant, which is combusted with additional fuel. For new power generation installations using gas turbines, the extraction of heat from the hot exhaust gas, without additional combustion, using a heat recovery steam generation (HRSG) system is preferred due to the increased efficiency of such a combined cycle. However, the capital cost of a heat recovery steam generation (HRSG) system necessary for extracting heat from the exhaust gas is high. Further, for new installations, NOx emissions from the gas turbine typically must be reduced using a flue gas denitrification system. The need for a denitrification system further increases the cost of the combined cycle process.

In retrofitting existing power generation installations, often referred to as "repowering", and to make efficient use of the existing facility while generating additional power, the use of a gas turbine topping cycle is known In a gas turbine topping cycle, the hot exhaust gas from a power-generating gas-fed turbine is used as the above-described hot exhaust gas. An HRSG system can be used with such an installation. However, due to the previously described high cost of the HRSG system, it is often more economical, in retrofitting an existing power generating installation, to recover the sensible heat from the hot turbine exhaust gasses using the existing fully-fired steam generation system, a process commonly referred to as "Hot-Windbox Repowering".

In Hot-Windbox Repowering systems, the hot exhaust gas is used as a preheated oxidant and replaces the combustion air in an existing air-fuel fired boiler. A typical boiler has two sections; a high temperature radiant section and a lower temperature, convection section. The turbine exhaust gas has a lower oxygen content than the normally used combustion air. Because a greater volume of lower oxygen-content hot exhaust gas is needed to burn the same amount of fuel in the radiant section, less energy becomes available in the radiant section. As a result, the flue gas leaving the radiant section contains a higher level of sensible heat. The higher level of sensible heat in the flue gas leaving the radiant section of the boiler, in turn, increases the amount of energy available in the convection section. This causes an imbalance in the operation of the boiler, results in inefficiency and often derates the capacity of the boiler.

A number of boiler modifications are therefore required to allow for the change of oxidant from air to hot turbine exhaust gas, and the resulting higher flue gas temperature and volume. Additional feed water preheater tubes and economizer tubes may need to be placed in, and the air heater may need to be removed from, the convection section New burners and a new windbox may be required to handle the hot exhaust gas and provide adequate flame stability. For coal-fired boilers, the heat input may have to be reduced significantly to avoid erosion of the boiler tubes (i.e., to maintain the gas velocity within the original design limits). In general, each of these modifications significantly increases the cost of the retrofit.

The recovery of sensible heat from an exhaust gas in a conventional combined cycle power generation system (a Rankine-cycle combustion process combined with a turbine topping cycle, has, to date, required a costly HRSG system including a specially designed convective boiler in combination with a steam turbine. Alternatively, in recovering turbine waste heat through an existing boiler with supplemental fuel firing, extensive modifications to the boiler have been required. Such retrofits are often not considered economically attractive due to the aforementioned high cost of retrofitting and the lower overall power generation efficiency of the hot windbox repowering system, compared to the combined cycle provided with a HRSG system.

Another disadvantage of repowering is the increased NOx emission from the gas turbine and boiler. In order to meet stringent NOx emission regulations, a catalytic deNOx system is typically required to reduce the level of NOx in the flue stream, which further increases the cost of repowering.

Accordingly, it is an object of this invention to provide an apparatus and method for recovering sensible heat from a hot exhaust gas that can be used in combination with an existing air-fuel fired combustion process, without requiring extensive modifications to the existing equipment.

A further object of the invention is to provide an apparatus and method, as described above, in which the level of NOx in the gas turbine exhaust gas is reduced in the downstream combustion process so that the overall NOx emission from the converted system does not exceed the NOx emission level of the air-fuel fired system prior to conversion.

SUMMARY OF THE INVENTION

A method and apparatus are described for recovering sensible heat from a hot exhaust gas having an oxygen content of less than 21 vol % in a fuel-air fired combustion device. The hot exhaust gas and an oxygen-enriched oxidant stream comprising a gas having an oxygen content of greater than 21 vol % is introduced into the combustion process to form an oxidant mixture comprising hot exhaust gas, oxidant and any remaining air, the mixture having an average combined oxygen content of less than 21 vol %.

Although the average combined oxygen content is below the 21 vol % of the air for which the combustion apparatus was designed, combustion at a level at least substantially equal to that achieved with air combustion is achieved, with less fuel, as a result of the sensible heat recovered from the hot exhaust gas. Further, because the oxygen content of the mixture is below that of the air, the sensible heat recovery is balanced between the sections of the boiler. Thus, the recovery of the sensible heat from the hot exhaust gas does not result in an imbalance in the operation of the combustion device. As a result, sensible heat can be recovered from the hot exhaust gas without requiring substantial modifications to a combustion device originally designed for air-fuel combustion.

BRIEF DESCRIPTION OF THE DRAWINGS

FIG. 3 graphically represents the oxygen concentration of a hot oxidant created by burning a small amount of natural gas in air at various adiabatic temperatures that will provide an amount of available heat in a combustion process equivalent to that of a combustion process using ambient air (line 1) and air preheated to 400° F. (line 2)

DETAILED DESCRIPTION OF A PREFERRED EMBODIMENT

Figure 1:
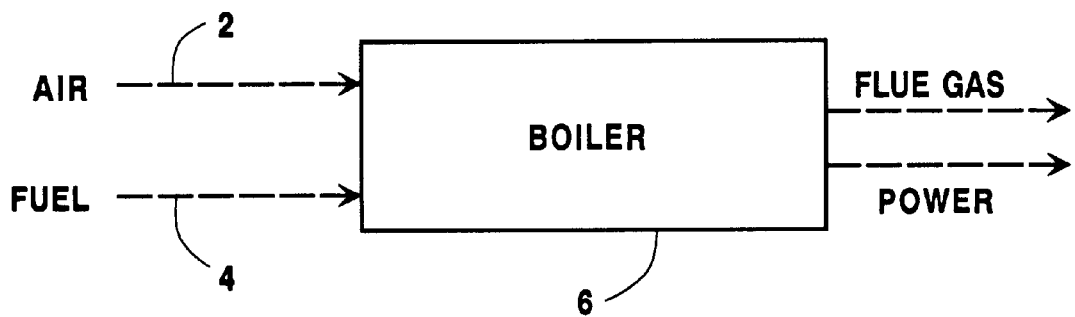
FIG. 1 is a schematic diagram of a prior art air-fuel fed combustion device.

A combustion device, typically a fuel fired boiler power plant is shown in FIG. 1. In such a device, fuel and air are fed, by a fuel feed 4 and an air feed 2, respectively, to boiler 6. In boiler 6, the air-fuel mixture is combusted to generate steam and produce electric power.

Figure 2:
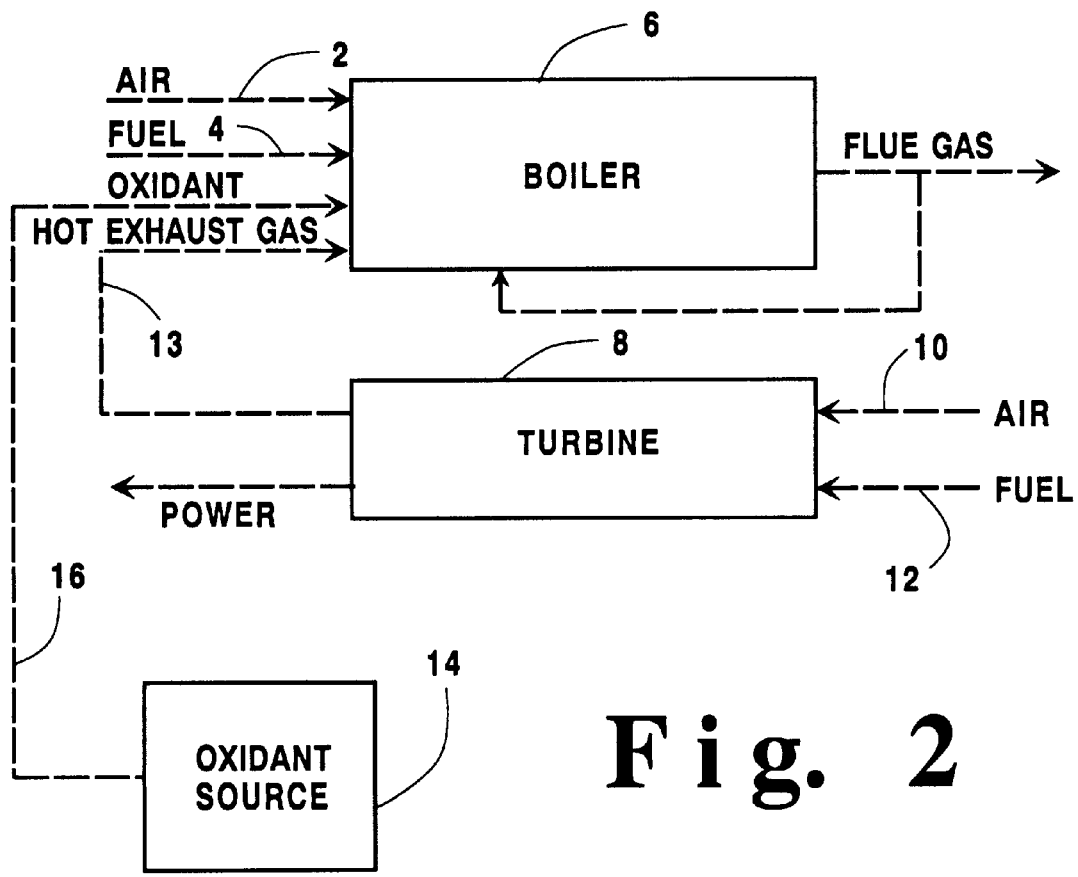
FIG. 2 is a schematic diagram of a combustion device as shown in FIG. 1 in which the air-fuel feeds are supplemented with a hot exhaust gas supply from an exhaust-generating apparatus, and an oxidant supply, in accordance with the present invention.

A combustion device comprising boiler 6 in combination with a gas turbine 8, in a system in accordance with the present invention, is shown in FIG. 2. Air and fuel are fed, by fuel feed 4 and air feed 2, respectively, to boiler 6, which is designed for fuel-air combustion, in the same manner as described above. At the same time, gas turbine 8 is provided with fuel and air through turbine fuel feed 12, and turbine air feed 10, respectively. Turbine 8 functions, in the usual manner, to combust the air-fuel mixture to provide power. As a combustion by-product, turbine 8 generates a hot exhaust gas. A typical gas turbine exhaust gas will have a temperature of about 1000 to about 1100° F., and an oxygen content of about 13 to about 14%. A fuel-air fired combustion process is a process which, at least initially, combines fuel and air for combustion. A fuel-air fired combustion device is a device designed to carry out a fuel-air fired combustion process.

To recover sensible heat from the hot exhaust gas generated by turbine 8, and thereby save fuel, the hot exhaust gas, which has an oxygen content of less than 21 vol % and usually within the range of from 10 to 16 volume percent, is introduced into boiler 6 via hot exhaust feed 13. At the same time, an oxygen-enriched oxidant having an oxygen content greater than 21 vol % is fed from an oxidant source 14 to boiler 6 via oxidant feed 16 to form an oxidant mixture of the air, hot exhaust gas and oxidant available for combustion within boiler 6. The mixture has an average combined oxygen concentration that is greater than that of the hot exhaust gas, but less than 21 vol %. Air, hot exhaust gas and oxygen-enriched oxidant may be used separately, or as an oxidant mixture, to burn the fuel in stages in order to reduce NOx emissions. The flow of air, hot exhaust gas, oxygen-enriched oxidant and fuel can be adjusted for any given boiler load to operate the boiler at optimum efficiency The oxidant mixture of this invention does not require that the fluids making up the mixture be actually mixed. The fluids could be introduced separately to the combustion process or device and could interact with the fuel separate from one another in the combustion process or device Because the oxygen concentration of the hot exhaust gas/air mixture is increased by providing an oxygen-enriched oxidant stream, the available heat in the radiant section of the boiler is increased. As a result, an excessive level of sensible heat is not provided to the convection section of the boiler, as occurs when the exhaust gas is used as an oxidant without oxygen supplementation. It is, therefore, not necessary to modify the boiler to account for this imbalance. For proper combustion without modification to the boiler, it would be expected that the oxygen content of the oxidant mixture should be raised to be substantially equal to that of air, (about 21 vol %). It has been found, however, that due to the sensible heat being recovered from the hot exhaust gas, a surprisingly small amount of the oxygen-enriched oxidant is required, and it is only necessary to have the oxygen concentration of the oxidant mixture to be between about 16 to about 19 vol % to provide the similar combustion conditions in boiler 6 that would be achieved with air combustion in the absence of the sensible heat recovered from the hot exhaust gas.

Because oxygen is expensive relative to air, the resent process, which requires less than the expected mount of oxygen, provides an important economical advantage. The amount of fuel saved in the boiler is substantially equal in BTU content to the amount of sensible heat recovered from the hot exhaust gas, for boilers designed to use ambient air without preheating. The apparent heat recovery efficiency of 100%, expressed in terms of fuel savings in lower heating values, is unexpected as the flue gas temperature, or temperature at which the hot turbine gas is discharged to the atmosphere after combustion in the boiler, is about 300 to about 400° F. By comparison, typical heat recovery efficiency in an HRSG system in which hot turbine gas is cooled from about 1000–1100° F. to about 300–400° F. is only 60 to 70%. Further, the sensible heat recovered from the hot exhaust gas does not result in an imbalance in the operation of boiler 6 due to the controlled amount of available heat supplied to the radiant section of boiler 6 with the addition of the oxidant-enriched rich oxidant stream 16. Therefore, again, boiler 6 operates under combustion conditions similar to air-fuel combustion conditions for which boiler 6 was initially designed, without modification. Another surprising aspect of the invention is that the sensible heat of the hot exhaust gas can be recovered in any process furnace fired. with ambient or mildly preheated air, including process furnaces that have a flue gas temperature that is higher than the temperature of the hot exhaust gas.

The invention will be further illustrated by means of the following examples:

COMPARATIVE EXAMPLE 1

Direct Combustion of a Turbine Exhaust Gas

In a baseline process (Case 1A) a boiler is fired with natural gas and ambient air at a 1261 MMBtu LHV/hr. As a result, 601 MMBtu/hr of heat is available in the radiant section of the boiler from which a flue gas exits at a temperature of 2000° F. The available heat corresponds to 47.6% of the fuel input. A hot turbine exhaust gas is then substituted for the combustion air (Case 1B) such that the natural gas fired with the hot turbine exhaust gas provides the same total heat input. Because there is 338 MMBtu/hr of sensible heat contained in the turbine exhaust gas, the firing rate is reduced to 923 MMBtu/hr. The total volume of oxidant is increased from 14,378,000 SCFH to 17,067,000 SCFH, which can create an over-pressure problem. Available heat in the radiant section is reduced to 39.9% of the total energy input (fuel input plus sensible heat of turbine exhaust gas) and as a result, only 503 MMBtu/hr is available in the radiant section of the boiler, which is 98 MMBtu/hr less than the baseline. The sensible heat to the convective section of the boiler, on the other hand, is increased by 98 MMBtu/hr, from 660 to 758 MMBtu/hr. This causes an imbalance in the heat distribution between the radiant section and the convective section of the boiler requiring mechanical modification of the boiler to allow for the use of the hot exhaust gas as the oxidant.

EXAMPLE 2

Total Replacement of Air with an Oxygen-Enhanced Turbine Exhaust Gas

In a baseline process (Case 2A) a boiler is fired at a partial load with natural gas and ambient air at a rate of 1538

MMBtu LHV/hr. 732 MMBtu/hr of heat is available in the radiant section of the boiler corresponding to 47.3% of the fuel input. The boiler is then fired with natural gas and a turbine exhaust gas with oxygen addition (Case 2B) to provide the same total heat input. Since there are 338 EMBtu/hr of sensible heat contained in the turbine exhaust gas, the firing rate is reduced to 1200 MMBtu LHV/hr. 614,000 SCFH of oxygen is added to 17,067,000 SCFH of hot turbine exhaust gas having an oxygen content of 13.6 vol % to provide a combined oxidant mixture having an average combined oxidant content of 16.6 vol % and an average temperature of 1,053° F. Due to this surprisingly modest increase in oxygen concentration, the available heat is raised to match that of Case 2A (732 MMBtu/hr) and the sensible heat supplied to the convection section is caused to match that of the air-fired process (805 MMBtu/hr). Therefore, a hot oxidant mixture with an oxygen content of 16.6%, and a temperature of 1,053° F., is equivalent to ambient air (at 21% O2 and 77° F.) for this boiler. As a result, a boiler originally designed for ambient air combustion can be retrofitted with a turbine exhaust gas combustion cycle without significant modification.

EXAMPLE 3

Partial Replacement of Air with Oxygen Enhanced Combustion of Turbine Exhaust Gas In a baseline process (Case 3A) the boiler of Example 2 is fired at full load with natural gas and combustion air at a rate of 2,707 MMBtu LHV/hr. 1289 MMBtu/hr of heat is available in the radiant section of the boiler. The available heat corresponds to 47.6% of the fuel input. The boiler is then fired with turbine exhaust gas and oxygen addition replacing a portion of the combustion air to provide the same total heat input. The firing rate is reduced to 2,370 MMBtu LHV/hr. The combustion air flow rate is reduced from 30,869,000 SCFH to 13,340,000 SCFH and 614,000 SCFH of oxygen is added to 17,067,000 SCFH of hot turbine exhaust gas. The flow rates of turbine exhaust gas and oxygen, and the oxygen concentration of the mixture (16.6 vol %) are the same as in Example 2 The average temperature of the oxidant mixture is 1,053° F. The average oxygen content of the mixed oxidant, including the air, is increased to 18.4 vol % and the temperature reduced to 654° F. because only a portion of the combustion air is replaced with the oxygen enhanced turbine exhaust gas. Both the available heat (1289 MMBtu/hr) in the radiant section, and the sensible heat MMBtu/hr provided to the convective section of the boiler match the baseline numbers. Thus, the boiler designed for ambient air combustion can be operated by partially replacing the combustion air with an oxygen-enhanced exhaust gas, without boiler tube modifications. A much greater volume of hot exhaust gas can be used in the boiler by further reducing the amount of combustion air and providing additional oxygen. The maximum amount of gas turbine exhaust gas that can be handled by this boiler is about 30,039,000 SCFH, which corresponds to about 94.7 MW of power output from the gas turbine. At this rate no combustion air is used and about 1,800,000 SCFH of oxygen is required.

Case 3C illustrates the use of an oxygen-enriched oxidant, instead of pure oxygen. The oxygen concentration of the oxygen-enriched oxidant is 24.4 vol % and the flow rate is 13,954,000 SCFH. These values are chosen to match the average oxygen concentration and the total flow rate of the air and oxygen mixture of Case 3B so that no combustion air is required Therefore, the hot oxidant mixture with an oxygen concentration of 18.4% and a temperature of 654 F is equivalent to ambient air (at 21% O2 and 77° F.) for this boiler and Case 3C becomes equivalent, in effect, to Case 3B. When the oxygen concentration of the oxygen-enriched oxidant is relatively low, a large amount of oxygen-enriched oxidant must be mixed with the hot exhaust gas in order to make the resulting oxidant mixture equivalent to the original combustion air. The resulting oxidant mixture has a higher volume, a higher oxygen concentration and a lower temperature, compared to the use of pure oxygen.

EXAMPLE 4

Partial Replacement of Air with Oxygen Enhanced Combustion of Exhaust Gas for Boiler with Preheated Air To provide a baseline (Case 4A), a boiler is fired at full load with natural gas and ambient air at 2,707 MMBtu/hr. The air has a preheat temperature of 400° F. and, as a result, more energy (1,473 MMBtu/hr) is available in the radiant section of the boiler. The available heat corresponds to 50.95% of the total energy input (fuel input plus air preheat energy). The boiler is then fired with natural gas and turbine exhaust gas with oxygen addition to provide the same energy input and available heat. The firing rate is reduced to 2,478 MMBtu LHV/hr, which provides a fuel savings of 230 MMBtu/hr (compared to 338 MMBtu/hr in Case 3B). The combustion air flow rate is reduced from 30 30,869,00 SCFH to 12,730,000 SCFH and 976,000 SCFH of oxygen is added to 17,067,000 SCFH of hot turbine exhaust gas. The oxygen concentration of the mixture of turbine exhaust gas and oxygen is 18.2 vol %. The average temperature is 1,035° F. The average oxygen content of the mixed oxidant, including the air, is increased to 19.3 vol % and the temperature is reduced to 782° F. because only a portion of the combustion air is replaced with the oxygen enhanced turbine exhaust gas.

Both the available heat (1,473 MMBtu/hr) in the radiant section, and the sensible heat (1,418 MMBtu/hr) provided to the convective section of the boiler match the baseline numbers. Thus, a boiler designed for preheated air combustion can be operated with a portion of the combustion air replaced with oxygen-enhanced turbine exhaust, without modifications to the boiler tubes. However, the fuel reduction corresponds to only a 68% recovery of the sensible heat from the turbine exhaust gas, and a substantially greater amount of oxygen is required in comparison to Case 3B. Therefore, the recovery of turbine exhaust heat in a boiler using ambient air is preferred to the use of a boiler equipped with an air preheater.

Case 4C illustrates the effect of using an oxygen-enriched oxidant, similar to Case 3C. The oxygen concentration of the oxygen-enriched oxidant is 26.5 vol % and the flow rate is 13,706,000 SCFH. With this oxidant, no combustion air is required and Case 4C becomes equivalent to Case 4B. Thus, the hot oxidant mixture with an oxygen concentration of 18.2% and a temperature of 1,035° F. and the hot oxidant mixture with an oxygen concentration of 19.3% and a temperature of 782 F are both equivalent to preheated air (at 21% O2 and 400° F.) for this boiler.

In this analysis, the air preheat temperature was assumed to stay constant at 400° F. although the combustion air flow rate was reduced from 30,869,000 to 12,730,000 SCFH. If no modifications are made to the original air preheater section of the boiler, the air preheat temperature becomes higher. Also, the boiler flue gas temperature, after the air preheater, increases. Therefore, actual fuel reduction would be higher and oxygen requirement lower. The excess heat available in the boiler flue gas can be recovered by replacing a portion of the air heater with a feed water heater or an oxygen preheater.

EXAMPLE 5

Replacement of Air with Oxygen Enhanced Combustion Gas in an Industrial Process Furnace As a baseline (Case 5A), a process furnace was fired at full load with natural gas and ambient air at a rate of 180.5 MMBtu LHV/hr. 138 MMBtu/hr of heat is available in the process furnace operating at a 1,000° F. flue gas temperature. The available heat corresponds to 76.45% of the fuel input due to the relatively low process temperature. A 5.4 MW industrial scale gas turbine is added for power generation. In process furnace applications it is not necessary to match the sensible heat of the flue gas (which becomes flue gas heat loss), provided the available heat to the process is maintained. Thus, the amount of fuel and oxygen can be adjusted to various levels and provide the same amount of available heat to the process.

In Case 5B, natural gas is fired with turbine exhaust gas without oxygen addition to provide the same available heat as in Case 5A. The firing rate is reduced to 152 MMBtu LVH/hr. The total volume of oxidant is increased from 2,058,000 SCFH to 2,390,000 SCFH. This increase may not cause an overcapacity problem for the existing flue gas recovery system Fuel savings, compared to the baseline air case is 28 MMBtu/hr, or 83% of the sensible heat in the exhaust gas. Relatively high heat recovery efficiency is achieved in this process, without the addition of oxygen, because of the relatively low process temperature of 1,000° F.

In Case 5C, the amount of added oxygen is reduced. The combustion air flow rate is reduced from 2,058,000 SCFH to 310,000 SCFH and 60,000 SCFH of oxygen is added to 1,707,000 SCFH of hot turbine exhaust gas. The oxygen content of the mixture of turbine exhaust gas and oxidant is 16.5% The average oxygen content of the mixed oxidant, including the airs is 17.2% since only a portion of the combustion air is replaced with the oxygen enhanced turbine exhaust gas. The available heat to the furnace is maintained at 138 MMBtu/hr and the sensible heat in the flue gas is also matched to the baseline number. The total volume of oxidant is increased only slightly from 2,058,000 SCFH to 2,077,000 SCFH. Thus, no modification to the existing flue handling system is required. A fuel saving of 34 MMBtu/hr, compared to the baseline is realized. This fuel savings corresponds to 100% recovery of the sensible heat from the hot exhaust gas.

In Case 5D, natural gas is fired with turbine exhaust gas without oxygen addition, and without air, to provide the same available heat as in Case 5A. The firing rate is further reduced to 142 MMBtu LHV/hr. 110,000 SCFH of oxygen is added to 1,707,000 SCFH of hot turbine exhaust gas. The average oxygen content of the mixed oxidant is 18.8 vol. %.

Although the greatest fuel savings is provided by the process of Case 5D, this process also requires substantially more oxygen, which is expensive, compared to air. In Case 5D, 0.137 ton of oxygen is required to save 1 MMBtu LHV of fuel compared to 0.075 ton/MMBtu for Case 5C. When incremental fuel savings over Case 5B, rather than over Case 5A, is considered, the specific oxygen requirement for both Case 5C and 5D becomes 0.45 ton/MMBtu LHV saved. Therefore, the most economical operation of the inventive process will depend on the relative costs of fuel and oxygen and the use of oxygen may not necessarily be economical for combustion processes with relatively low temperatures.

EXAMPLE 6

Replacement of Air with Oxygen Enhanced Combustion Gas in a High Temperature Industrial Process Furnace As a baseline (Case 6A), a process furnace was fired at full load with natural gas and ambient air at a rate of 180.5 MMBtu LHV/hr. Only 64 MMBtu/hr of heat is available in the process furnace operating at a 2,400° F. flue gas temperature. The available heat corresponds to 35.2% of the fuel input due to the high process temperature. As in Example 5, a 5.4 MW industrial scale gas turbine is added for power generation.

In Case 6B, natural gas is fired with turbine exhaust gas without oxygen addition to provide the same available heat. The firing rate needs to be slightly increased to 180.5 MMBtu LHV,/hr, in spite of the additional sensible heat in the turbine exhaust gas. Therefore, it is not possible to recover the sensible heat of turbine exhaust gas in this high temperature furnace because of the higher flue gas volume and resulting sensible heat loss to flue gas. The total volume of oxidant is increased from 2,058,000 SCFH to 2,714,000 SCFH which may cause an over-capacity problem of the existing flue gas handling system.

In Case 6C, the combustion air flow rate is reduced from 2,058,000 SCFH to 306,000 SCFH and 61,000 SCFH of oxygen is added to 1,707,000 SCFH of hot turbine exhaust gas. The oxygen concentration of the mixture of turbine exhaust gas and oxygen is 16.5 vol %. The average oxygen content of the mixed oxidant, including the air, is 17.2 vol %, since only a portion of combustion air is replaced with oxygen enhanced turbine exhaust gas. The available heat to the furnace is maintained at 64 MMBtu/hr and the sensible heat in the flue gas is also matched to the baseline number. The total volume of oxidant is increased only slightly from 2,058,000 SCFH to 2,073,000 SCFH. Thus, no modification of the existing flue handling system is required. A fuel saving of 34 MMBtu/hr, compared to the baseline is realized. This fuel savings corresponds to 100% recovery of the sensible heat from the hot exhaust gas.

In Case 6D, natural gas is fired with turbine exhaust gas with oxygen addition, and without air, to provide the same available heat as in Case 6A. 27,000 SCFH of oxygen is added (i.e. total oxygen flow rate of 88,000 SCFH) to replace the remaining air, and mixed with 1,707,000 SCFH of hot turbine exhaust gas. The firing rate is further reduced to 131.8 MMBtu LVH/hr. This additional fuel savings is attributable to replacement of air with oxygen. The average oxygen content of the mixed oxidant is 17.8 vol %. The apparent fuel savings corresponds to 144% of the sensible heat in the turbine exhaust gas. In both Case 6C and 6D, specific oxygen consumption is 0.076 ton of oxygen per MMBtu LHV of fuel saved.

The data for the examples is summarized in Tables 1–3.

TABLE 1

OPERATING CONDITIONS OF GAS TURBINES

|  | CASES 2–4 | CASES 5,6 |
|---|---|---|
| FUEL INPUT (MMBTU HHV/HR) | 580.00 | 58 |
| AIR FLOW RATE (1,000 SCFH) | 16,500 | 1,650 |
| (% OF STOICH. AIR) | 304 | 304 |
| POWER OUTPUT (MW) | 53.8 | 5.4 |
| HEAT RATE (BTU HHV/KWH) | 10,774 | 10,774 |
| TEMPERATURE OF EXHAUST GAS (F.) | 1,085 | 1,085 |
| $O_2$ CONCENTRATION (VOL %) | 13.6 | 13.6 |
| SENSIBLE HEAT IN EXHAUST GAS (MMBTU/HR) | 340 | 1,346 |
|  |  | 34 |
| HEAT LOSS IN DUCTS (MMBTU/HR) | 2 | 0 |

TABLE 2

BOILER OPERATING CONDITIONS FOR EXAMPLES 1–4

| | CASE 1A (AIR) BASE LINE | CASE 1B (EXHT GAS) | CASE 2A (AIR) BASE LINE | CASE 2B (EXH + O2) | CASE 3A (AIR) FULL LOAD | CASE 3B (EXH + OXI) FULL LOAD | CASE 3C (EXH + OXI) FULL LOAD | CASE 4A BASE-LINE 400 F. AIR | CASE 4B (EXH + O2) 400 F. AIR | CASE 4C (EXH + OXI) 400 F. AIR |
|---|---|---|---|---|---|---|---|---|---|---|
| FUEL INPUT | | | | | | | | | | |
| (MMBTU HHV/HR) | 1,397 | 1,023 | 1,704 | 1,330 | 3,000 | 2,626 | 2,626 | 3,000 | 2,745 | 2,475 |
| (MMBTU LHV/HR) | 1,261 | 923 | 1,538 | 1,200 | 2,707 | 2,370 | 2,370 | 2,707 | 2,478 | 2,478 |
| SENSIBLE HEAT IN EXHAUST GAS | | 338 | | 338 | | 338 | 338 | | 338 | 338 |
| AIR PREHEAT ENERGY (MMBTU/HR) | | | | | | | | 184 | 76 | 76 |
| AIR PREHEAT TEMP. (F.) | 77 | 77 | 77 | 77 | 77 | 77 | 77 | 400 | 400 | 400 |
| AIR FLOW RATE (1,000 SCFH) | 14,378 | 0 | 17,534 | 0 | 30,869 | 13,340 | 0 | 30,869 | 12,730 | 0 |
| EXHAUST GAS FLOW RATE (1,000 SCFH) | | 17,067 | | 17,067 | | 17,067 | 17,067 | | 17,067 | 17,067 |
| O2 RICH OXIDANT FLOW RATE (1,000 SCFH) | | 0 | | 614 | | 614 | 13,954 | | 976 | 13,706 |
| O2 RICH OXIDANT O2 CONC. VOL % | | | | 100 | | 100 | 24.4 | | 100 | 26.5 |
| EXH GAS-O2 RICH MIX | | | | | | | | | | |
| O2 CONC. (VOL %) | | | | | | 16.6 | 18.4 | | 18.2 | 19.3 |
| AVG TEMP (F.) | | | | | | 1,053 | 1,053 | | 1,035 | 782 |
| TOTAL OXIDANT FLOW RATE (1,000 SCFH) | 14,378 | 17,067 | 17,534 | 17,681 | 30,869 | 31,021 | 31,021 | 30,869 | 30,773 | 30,773 |
| AIR EXH GAS-OXI MIX | | | | | | | | | | |
| O2 CONC. (VOL %) | 20.9 | 13.6 | 20.9 | 16.6 | 20.9 | 18.4 | 18.4 | 20.9 | 19.3 | 19.3 |
| AVG TEMP (F.) | 77 | 1,085 | 77 | 1,053 | 77 | 654 | 654 | | 782 | 782 |
| PROCESS TEMPERATURE (F.)] (FLUE GAS TEMP AFTER RADIANT SECTION) | 2,000 | 2,000 | 2,000 | 2,000 | 2,000 | 2,000 | 2,000 | 2,000 | 2,000 | 2,000 |
| AVAILABLE HEAT (MMBTU/HR) | 601 | 503 | 732 | 732 | 1,289 | 1,289 | 1,289 | 1,473 | 1,473 | 1,473 |
| AVAILABLE HEAT (% OF LHV + T. EXHS) | 47.6 | 39.9 | 47.6 | 47.6 | 47.6 | 47.6 | 48 | 51 | 50.9 | 50.9 |
| SENSIBLE HEAT TO CONV. SECTION | 660 | 758 | 805 | 805 | 1,418 | 1,418 | 1,418 | 1,418 | 1,418 | 1,418 |
| POWER OUTPUT (MW) | | 170 | | 170 | 300 | 300 | 300 | 300 | 300 | 300 |
| HEAT RATE (BTU HHV/KWH) | | 10,000 | | 7,803 | 10,000 | 8,754 | 8,754 | 10,000 | 9,151 | 9,151 |
| TOTAL POWER OUTPUT (MW) | | 170 | | 224 | 300 | 354 | 354 | 300 | 354 | 354 |
| TOTAL FUEL INPUT (MMBTU HHV/HR) | | 1,704 | | 1,910 | 3,000 | 3,206 | 3,206 | 3,000 | 3,325 | 3,325 |
| AVERAGE HEAT RATE (BTU HHV/KWH) | | 10,000 | | 8,518 | 10,000 | 9,062 | 9,062 | 10,000 | 9,400 | 9,400 |
| INCREMENTAL HEAT RATE (BTU HHV/KWH) | | | | 3,824 | | 3,832 | 3,832 | | 6,051 | 6,051 |
| FUEL SAVED IN BOILER (MMBTU LHV/HR) | | | | 338 | | 337 | 337 | | 230 | 230 |
| HEAT RECOVERY RATIO (LHV FUEL REDUCED/ TURB. EXHST HEAT) | | | | 1.00 | | 1.00 | 1.00 | | 0.68 | 0.68 |
| OXYGEN/T. EXH. HEAT (T/MMBTU LHV) | | | | 0.077 | | 0.077 | 0.077 | | 0.179 | 0.179 |

TABLE 3

COMBUSTION CONDITIONS IN PROCESS FURNACES FOR EXAMPLES 5 AND 6

| | CASE 5A BASELINE COLD AIR | CASE 5B (EXH + AIR) COLD AIR | CASE 5C (EXH + O2 + AIR) COLD AIR | CASE 5D (EXH + O2) COLD AIR | CASE 6A BASELINE COLD AIR | CASE 6B (EXH + O2 + AIR) COLD AIR | CASE 6C (EXH + O2 + AIR) COLD AIR | CASE 6D (EXH + AIR) COLD AIR |
|---|---|---|---|---|---|---|---|---|
| FUEL INPUT | | | | | | | | |
| (MMBTU HHV/HR) | 200 | 169 | 162 | 157 | 200 | 200 | 162 | 146 |

TABLE 3-continued

COMBUSTION CONDITIONS IN PROCESS FURNACES FOR EXAMPLES 5 AND 6

|  | CASE 5A BASELINE COLD AIR | CASE 5B (EXH + AIR) COLD AIR | CASE 5C (EXH + O2 + AIR) COLD AIR | CASE 5D (EXH + O2) COLD AIR | CASE 6A BASELINE COLD AIR | CASE 6B (EXH + O2 + COLD AIR) | CASE 6C (EXH + O2 + AIR) | CASE 6D (EXH + AIR) COLD AIR |
|---|---|---|---|---|---|---|---|---|
| (MMBTU LHV/HR) | 180.5 | 152.2 | 146.6 | 141.9 | 180.5 | 180.6 | 146.6 | 131.8 |
| SENSIBLE HEAT IN EXHAUST GAS |  | 33.9 | 33.9 | 33.9 |  | 33.9 | 33.9 | 33.9 |
| AIR PREHEAT ENERGY (MMBTU/HR) | 0 | 0 | 0 | 0 | 0 | 0 | 0 | 0 |
| AIR PREHEAT TEMPERATURE (F.) | 77 | 77 | 77 | 77 | 77 | 77 | 77 | 77 |
| AIR FLOW RATE (1,000 SCFH) | 2,058 | 683 | 310 | 0 | 2,058 | 1,007 | 306 | 0 |
| EXHAUST GAS FLOW RATE (1,000 SCFH) |  | 1,707 | 1,707 | 1,707 |  | 1,707 | 1,707 | 1,707 |
| O2 RICH OXIDANT FLOW RATE (1,000 SCFH) |  | 0 | 60 | 110 |  | 0 | 61 | 88 |
| O2 RICH OXIDANT: O2 CONC. (VOL %) |  | 100 | 100 | 100 |  | 100 | 100 | 100 |
| EXH GAS-O2 RICH MIX |  |  |  |  |  |  |  |  |
| O2 CONC. (VOL %) |  | 13.6 | 16.5 | 18.8 |  | 13.6 | 16.5 | 17.8 |
| AVG TEMP (F.) |  | 1,085 | 1,053 | 1,028 |  | 1,085 | 1,053 | 1,039 |
| TOTAL OXIDANT FLOW RATE (1,000 SCFH) | 2,058 | 2,390 | 2,077 | 1,817 | 2,058 | 2,714 | 2,073 | 1,794 |
| AIR-EXH GAS-OXI MIX |  |  |  |  |  |  |  |  |
| O2 CONC. (VOL %) | 20.9 | 15.7 | 17.2 | 18.8 | 20.9 | 16.3 | 17.2 | 17.8 |
| AVG TEMP (F.) |  | 815 | 918 | 1,028 |  | 815 | 919 | 1,039 |
| PROCESS TEMPERATURE (F.) (FLUE GAS TEMP AFTER RADIANT SECTION) | 1,000 | 1,000 | 1,000 | 1,000 | 2,400 | 2,400 | 2,400 | 2,400 |
| AVAILABLE HEAT (MMBTU/HR) | 64 | 138 | 138 | 138 | 64 | 64 | 64 | 64 |
| AVAILABLE HEAT (% OF LHV + T. EXHS) | 76.5 | 74.1 | 76.5 | 78.5 | 35.2 | 29.6 | 35.2 | 38.3 |
| FUEL SAVED IN FURNACE (MMBTU LHV/HR) |  | 28 | 34 | 39 |  | 0 | 34 | 49 |
| HEAT RECOVERY RATIO (LHV FUEL REDUCED/TURB. EXHST HEAT) |  | 0.83 | 1.00 | 1.14 |  | 0.00 | 1.00 | 1.44 |
| OXYGEN/T. EXH HEAT — OVER CASE 5A OR 6A |  | 0.000 | 0.075 | 0.137 |  | 0.000 | 0.076 | 0.076 |
| (TON O2/MMBTU LHV) — OVER CASE 5B OR 6B |  |  | 0.45 | 0.45 |  |  | 0.076 | 0.076 |

Although described primarily in the context of a boiler or an industrial process furnace, the method of the present invention can be practiced with any air-fuel fired combustion device including, but not limited to, steam boilers, petroleum heaters, drying furnaces, high temperature process furnaces, and other ovens and kilns. The combustion device can be one fired with any suitable fuels including natural gas, oil and coal.

Similarly, although the method of the present invention has been described primarily with regard to a gas turbine, the invention can be practiced with any piece of process equipment that generates a hot exhaust gas having an oxygen concentration of less than 21 vol %. Suitable hot exhaust gas generating means include, but are not limited to, gas turbines, incinerators, thermal oxidizers and high temperature air separation units. Preferably, the hot exhaust gas will have a temperature of at least 400° F. and an oxygen concentration of at least 5 vol %. Most preferably, the oxygen concentration of the hot exhaust gas will be at least 10 vol %. A typical turbine exhaust gas will have a temperature of about 1000 to 1100° F., and an oxygen content of about 13 to 14 vol %.

The oxygen-enriched oxidant used to enhance the oxygen concentration of the hot exhaust gas will generally comprise at least 30 vol %, preferably comprises at least 80 vol %, and most preferably comprises at least 90 vol % oxygen. As shown in Examples 3 and 4, when the oxygen concentration of the oxygen-enriched oxidant is relatively low, a much greater amount of oxygen-enriched oxidant must be mixed with the hot exhaust gas. The resulting oxidant mixture has a higher volume, a higher oxygen concentration and a lower temperature, compared to the case in which the oxygen concentration of the oxygen-enriched oxidant is highs.

As described in the Examples, the oxygen enhanced hot exhaust gas can be substituted for all, or a portion of the combustion air. The average oxygen content of the mixture of the hot exhaust gas and the oxygen-enriched oxidant, excluding air, need only be about 1 to 5 percentage points by volume higher than that of the hot exhaust gas for most applications. As shown in the Examples, several factors including the oxygen concentration and temperature of the hot exhaust gas, the temperature of combustion air and the type of fuel used in the boiler or process furnace, and the oxygen concentration of oxygen-enriched oxidant, determine the amount of oxygen-enriched oxidant required. The desired conditions can be related to the average oxygen concentration and temperature of the total oxidant mixture and illustrated in FIG. 3 to replace ambient temperature combustion air or preheated combustion air at 400° F.

In FIG. 3, lines 1 and 2 represent "adiabatic oxidants" that provide the same available heat for combustion processes as air at temperatures of 77° F. (ambient air) and 400° F. (preheated air), respectively. These lines represent the adiabatic temperature and oxygen concentration of a hot oxidant. The hot oxidant is formed by burning a small amount of natural gas in air, which preheats the air and causes a corresponding reduction in oxygen concentration The hot oxidant represented by these lines is termed "air equivalent hot oxidant". There is an approximate linear relationship between temperature, $T_h$ expressed in ° F., and oxygen concentration of air equivalent hot oxidant, $C_o$ expressed in %, assuming combustion air is at temperature $T_o$° F.;

$$T_h = T_o + p(20.9 - C_o) \tag{1}$$

where p is a proportionality constant that depends on type of fuel; p is about 230° F./O$_2$% for natural gas. When this adiabatically preheated oxidant is used to replace the regular combustion air in a process furnace using the same fuel, the fuel requirement is reduced for the exact amount of the fuel used to produce the air equivalent hot oxidant. The available heat in the process furnace remains constant. There is an approximate linear relationship between fuel saved, $Q_f$ expressed in Btu (LHV), and the amount of combustion air at temperature $T_o$, $V_a$ expressed in SCF (ft$^3$ at 60° F.), replaced with air equivalent hot oxidant at temperature $T_h$;

$$Q_f = qV_a(T_h - T_o) \tag{2}$$

where q is a proportionality constant that is about 0.020 Btu/ft$^3$/F for natural gas regardless of the type or temperature of the process furnace.

Point (3) represents the conditions of gas turbine exhaust gas used in the Examples, which is below the adiabatic point (2) on Line 1. The temperature difference between point (2) and point (3) is caused by the energy extracted and heat losses in the gas turbine system. (Note: the temperature at point (2) does not correspond to the adiabatic combustor temperature of the gas turbine since compression of air is not considered). Because of this deficiency in the energy content of the gas turbine exhaust gas, the use of gas turbine exhaust gas in a process furnace results in reduced available heat The essence of this invention is to enhance the oxygen concentration of the turbine exhaust gas with oxygen-enriched gas and bring it to the "air equivalent hot oxidant" line. That is, the average combined oxygen concentration of the oxidant mixture of this invention is preferably within one volume percent of that of the air equivalent hot oxidant.

Points (4) and (5) represent the oxidant conditions achieved in Example 3. When pure oxygen is used (Case 3B) the "air equivalent hot oxidant" line is reached without significant loss in temperature (Point (4)). When the oxygen concentration of oxygen-enriched oxidant is relatively low (24.4% in Case 3C), a much greater amount of oxygen-enriched oxidant must be mixed with the hot exhaust gas. The resulting oxidant mixture has a higher volume, a higher oxygen concentration and a lower temperature (Point(5))

Similarly, points (7) and (8) represent the oxidant conditions of Case 4B and Case 4C, respectively. Greater amounts of oxygen-enriched oxidant are required to reach the "air equivalent hot oxidant" line because of the higher energy content of preheated air, represented by Point (6). Point (4) represents the "air equivalent hot oxidant" used for Example 5, Case 5C and Case 6C. In all these cases, sensible heat in the turbine exhaust gas is fully recovered as fuel savings, regardless of the temperature of the process furnaces or the boiler, thus, demonstrating the benefits of the invention The foregoing discussions are based on a hot turbine exhaust gas mixed "theoretically" with an oxygen-enriched oxidant to provide an oxidant mixture equivalent to combustion air, or air equivalent hot oxidant. In order to reduce NOx emissions from the gas turbine-boiler system, however, it is preferred to separately introduce the hot turbine exhaust gas, which contains NOx generated in the gas turbine, and the oxygen-enriched oxidant into the boiler to burn fuel in two or more stages, with each stage using a different oxidant stream. It is preferred to burn the fuel, in the first stage of combustion, under fuel rich condition with the hot turbine exhaust gas. Additional air or oxygen-enriched gas may be mixed with the gas turbine exhaust gas. It is preferred to inject the second stage oxidant, including oxygen-enriched oxidant and combustion air, if used, into the furnace in such a way to cause dilution of the oxidant with recirculated furnace gas prior to mixing with the fuel rich combustion products from the first stage of combustion. Oxidant dilution methods, such as those described in U.S. Pat. Nos. 5,601,425 or 5,242,296, can be used for the second stage combustion.

Although it is not possible to predict the optimum low NOx combustion conditions a priori for these unique combustion conditions, the availability of oxygen-enriched and oxygen depleted oxidant provides substantial flexibility and benefits for low NOx combustion. Compared to conventional air combustion, flame temperature is reduced when turbine exhaust gas is used due to the reduced oxygen concentration, while it is increased when oxygen rich gas is used. Thus, the present invention provides an added benefit in optimizing the stoichiometric ratio and temperature of the first and second stages of combustion for the maximum reduction of NOx contained in the turbine exhaust gas, while minimizing generation of additional NOx in the combustion of fuel. Other known staged combustion and reburning techniques can be used in tandem with the present invention, to minimize the $NO_x$ content of the resulting flue gas.

When a boiler and turbine are used in the combined power cycle of the present invention, it is more thermally efficient to operate the turbine at its maximum load at all times and adjust the thermal load of the boiler according to the overall power required. The boiler may be equipped with a flue gas recirculation system for steam temperature control or gas tempering or low NOx burner operation. Since oxygen depleted hot exhaust gas used in the present invention is equivalent to a mixture of combustion air and recirculated flue gas, the amount of gas recirculation can be reduced or eliminated. When gas recirculation is reduced the amount of oxygen-enriched oxidant should be reduced so as to balance the temperature requirement of the boiler. Although, practice of the present invention allows an air-fuel fired boiler to operate without major modification, some minor modifications may be needed to the burners and piping to allow for the handling of the hot turbine gas and additional oxidant flow.

It should be understood that the foregoing description and examples are only illustrative of the invention. Various alternatives and modifications can be devised by those skilled in the art without departing from the invention. Accordingly, the present invention is intended to include all such alternatives, modifications and variances which fall within the scope of the appended claims.

What is claimed is:

1. A method for recovering sensible heat from a hot exhaust gas, said method comprising:

introducing fuel, air and hot exhaust gas having an oxygen content less than 21% by volume into a fuel-air combustion device;

introducing into said combustion device an oxidant comprising a gas having an oxygen concentration greater than 21% by volume, to form an oxidant mixture in said combustion device having an average combined oxygen concentration of less than 21% by volume; and operating said combustion device at thermal conditions substantially equal to those achieved with air combustion of fuel in said combustion device, wherein the amount of fuel introduced into said combustion device is less than the amount of fuel used in said air combustion of fuel by an amount substantially equal in BTU content to the sensible heat of said hot exhaust gas as a result of recovery of sensible heal from said hot exhaust gas.

2. The method of claim 1, wherein said average combined oxygen concentration is less than 19% by volume.

3. The method of claim 1 wherein the air provided to said combustion device is reduced to zero.

4. The method of claim 1, wherein said combustion device houses a staged combustion process, a first stage of said staged combustion process is a fuel-rich stage and a second stage of staged combustion process comprises introduction of said oxidant into said combustion process, said oxidant being injected to cause recirculation of furnace gases to dilute said oxidant prior to mixing of said oxidant with the fuel-rich combustion products of said first stage.

5. The method of claim 1, wherein said exhaust gas is generated by a gas turbine, a diesel engine, an incinerator, thermal oxidizer or a high temperature air separation unit.

6. The method of claim 1, wherein said combustion device is a steam boiler, a petroleum heater, a drying furnace, an oven or a kiln.

7. The method of claim 1 further comprising means for passing recirculated flue gas into the combustion device.

* * * * *